ically retainable plug for the ugh a shunt system in- The valve includes a valve y and a first and a second These ports are connected to ct fluids to be drained, for exam- and to a shunt tube. A valve seat is round one of the ports so that h this respective port passes A plug is supported in the cav- vable toward and away from this

United States Patent [19]
Schulte et al.

[11] 3,827,439
[45] Aug. 6, 1974

[54] PLUG VALVE FOR PHYSIOLOGICAL SHUNT SYSTEMS

[75] Inventors: Rudolf R. Schulte, Santa Barbara, Calif.; Harold D. Portnoy, Bloomfield Hills, Mich.

[73] Assignee: Heyer-Schulte Corporation, Goleta, Calif.

[22] Filed: Oct. 30, 1972

[21] Appl. No.: 302,181

[52] U.S. Cl................ 128/350 V, 128/274, 251/342
[51] Int. Cl.............................................. A61m 27/00
[58] Field of Search ....... 128/348, 350 V, 274, 231, 128/232; 251/342

[56] References Cited
UNITED STATES PATENTS

| 2,121,354 | 6/1938 | Johnson | 251/342 X |
| 3,111,125 | 11/1963 | Schulte | 128/350 V |
| 3,492,996 | 2/1970 | Fountain | 128/350 V |
| 3,503,402 | 3/1970 | Schulte | 128/350 V |
| 3,707,972 | 1/1973 | Villari et al. | 128/274 X |

*Primary Examiner*—Dalton L. Truluck
*Attorney, Agent, or Firm*—Donald D. Mon

[57] ABSTRACT

A valve utilizing a mechanically retainable plug for the stoppage of drainage flow through a shunt system installed in a human body. The valve includes a valve body with an internal cavity and a first and a second port entering the cavity. These ports are connected to conduits which conduct fluids to be drained, for example, to a catheter and to a shunt tube. A valve seat is formed peripherally around one of the ports so that fluid flowing through this respective port passes through the valve seat. A plug is supported in the cavity so as to be movable toward and away from this port. The plug has a set of dimensions which is oversized relative to the valve seat so as to form a fit which will hold the plug in said port to close the valve at the valve seat. A compressible reservoir may be connected to one of the ports to function as a source of elevated pressure for the valve to remove the plug from the port. A check valve may be utilized with the reservoir to prevent backflow out of the reservoir when it is compressed. The valve may discharge into a shunt, which shunt may include a check valve that prevents reverse flow of fluids into the system.

19 Claims, 10 Drawing Figures

PATENTED AUG 6 1974 3,827,439

PLUG VALVE FOR PHYSIOLOGICAL SHUNT SYSTEMS

This invention relates to a plug valve for use in shunt systems for the human body.

Shunt systems for drainage of unwanted body fluids from one region of the body to another region are generally known. A well known usage of such shunt sytems is in the treatment of hydrocephalus, wherein the excess cerebro-spinal fluid is drained from the ventricles of the brain to an auricle of the heart. A known example of such a system is shown in Rudolf R. Schulte U.S. Pat. No. 3,111,125, issued Nov. 19, 1963, entitled "Drainage Device."

It is a shortcoming of some conventional shunt systems that they will always remain open to unidirectional flow whenever there is a differential pressure in the system equal to or greater than some "release pressure," which is an inherent property of each individual system. Under such circumstances, the potential of the body to correct its faulty processes so as no longer to be dependent upon the shunt may be frustrated, because pressure may not build up in the drained region to a value sufficient to overcome the faulty processes. Attempts to avert this frustration have tended to take the form of operating the system at a relatively high release pressure at all times. However, if the pressure is kept too high, damage may result; if the system pressure is kept too low, recovery may be frustrated. Because the release pressure cannot be adjusted, any change in it can only be attained by installing a new system with its own inherent higher or lower release pressure. Accordingly, it has been suggested that an off-on valve which can be closed to let pressure build up to any desired level, and which can be opened to release fluid and lower the pressure, may overcome the disadvantages of the prior art. It is an object of this invention to provide a simple, rugged and foolproof valve for this purpose.

Simplicity of construction and operation are definitely called for in devices of this type for the reason that complexity invites malfunction, and malfunction can have serious consequences, especially when the system controls the pressure in the brain. Accordingly, it is an object of this invention to provide an off-on valve, a system for opening and closing the valve, and a system including the said valve for draining fluid from a region to be drained and discharging it into a region to receive it all in an elegantly simple construction.

A valve according to this invention utilizes a plug which can be mechanically retained to the valve seat by means such as a friction fit or an inter-engagement fit (which are collectively referred to as an interference fit, or a "mechanical retention"), and thereby to stop flow of fluid through a shunt system. The valve includes a body with an internal cavity. A first port and a second port enter this cavity. A valve seat is formed peripherally around one of these ports so that fluid flowing through the respective port passes through the valve seat. The valve seat has a valving axis. A plug is supported in the cavity by deflectible means so as to be movable along the valving axis toward and away from the valve seat. The plug and the valve seat have interfering lateral dimensions in a plane normal to the valving axis, as a consequence of which the plug can be mechanically retained in contact with the valve seat to close the valve. Sufficient pressure in one of the ports can cause the plug to move out of the valving surface, thereby to open the valve.

According to a preferred but optional feature of the invention, the means for supporting the plug comprises a flexible member attached to or forming part of the body. The plug is attached to the member, and deflection of the member presses the plug into the valve seat. In one embodiment, the member is a diaphragm, and a differential pressure exerted on it will move the plug from the valve seat.

According to another preferred but optional feature of the invention, the plug includes a stem and a bulb. The bulb is enlarged to engage a shoulder formed adjacent to the respective port, thereby mechanically to retain the plug in the closed position.

According to another preferred but optional feature of the invention, a compressible reservoir is connected to one of the ports of the valve in such manner that pressure generated in the reservoir by compresssing it will be transmitted to the valve so as to open the same.

According to still another preferred but optional feature of the invention, a check valve is disposed upstream of the reservoir which permits flow of fluid from a catheter into the reservoir, but not the reverse.

According to yet another preferred but optional feature of the invention, the valve discharges into a shunt tube for disposition of fluid which has passed by the valve. The shunt tube may include a unidirectional check valve.

The above and other features of this invention will be fully understood from the following detailed description and the accompanying drawings in which.

Figure 1:
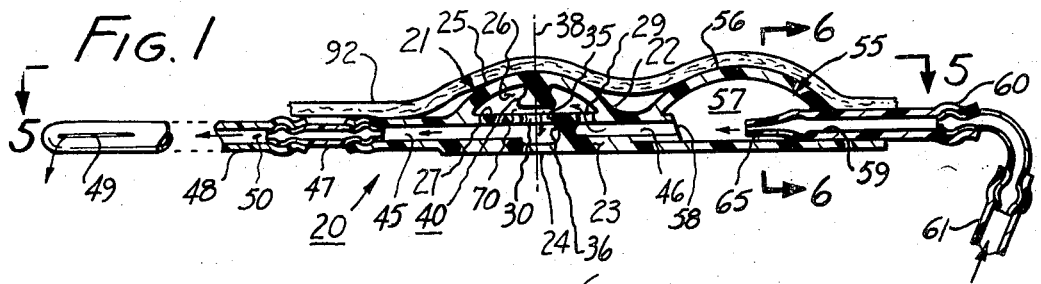
FIGS. 1–4 are side elevations, principally in axial cross-section, showing systems according to the invention in different operating positions.

FIG. 1 shows the presently preferred embodiment of the invention which is also the best mode contemplated by the inventor, wherein a drainage system 20 incorporates a valve 21 which is one subject of the invention. The valve includes a body 22 having a base 23 (preferably rigid) with a flat bottom 24. A dome-shaped flexible wall 25 is attached to the base. The flexible wall and base define an internal cavity 26. The cavity is partially bounded by a wall 27 formed on the base. A first port 29 and a second port 30 enter the cavity through wall 27.

A valve seat 35 is formed at the second port 30. It extends peripherally around it, and in the preferred embodiment, forms at least a portion of the boundary of this respective port. Fluid which passes through this port also passes through this valve seat, so that occluding the valve seat will close the port and therefore close the valve. A retention shoulder 36 is formed in the base adjacent to port 30 for a purpose yet to disclosed.

The valve seat has a dimension of length 37 (FIG. 2) relative to a valving axis 38, about which the seat is concentric. The seat has a lateral dimension 39 (FIG. 4) in a plane normal to the valving axis (i.e., in the plane of FIG. 5). The valve seat may be provided in a broad range of shapes which will be disclosed in more detail below. In the illustrated embodiment, it is crowned convexly into the port, and dimension 39 is its least diameter, the seat enlarging in both axial directions from the central portion where this dimension is located. The device is most conveniently made with the valve seat formed circularly in plan view.

Figure 2:
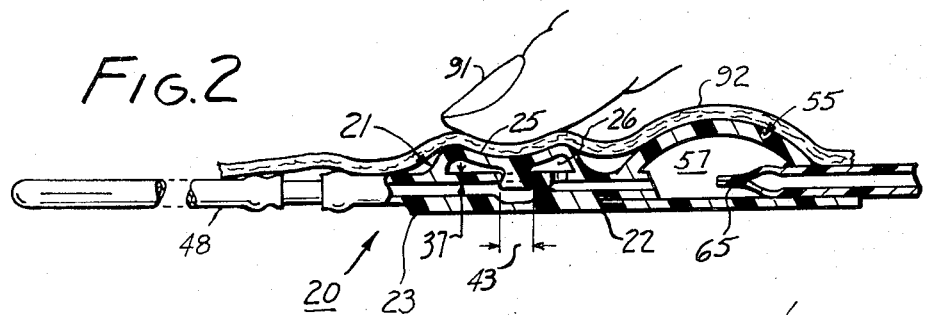

A plug 40 is attached to the inside of flexible wall 25 (sometimes called a "flexible member"). The flexible wall comprises deflectible means supporting the plug for axial movement along the valving axis toward and away from the valve seat. In its preferred embodiment, the plug comprises a stem portion 41 and a bulb portion 42. The axial length of the stem portion 41 is about equal to the axial spacing between wall 27 and shoulder 36 so that (as shown in FIG. 2) the bulb portion can be pressed through and beyond the valve seat, and the bulb portion will snap out and bear against the shoulder to resist the removal of the plug from the valving surface. The stem portion has a lateral dimension 41a (in this case a diameter) which, when the plug is pressed into the valve seat will be axially aligned with dimension 39 of the valve seat, and which is at least as large, or larger than, dimension 39.

For convenience, the term "valve seat" may mean the boundary of that portion of the boundary of port 30 which the plug contacts to close port 30. The bulb portion has a lateral dimension 43 which is greater than the least diameter of shoulder 36. This provides for inter-engagement of the bulb portion and the shoulder for retention purposes. This inter-engagement may also be used for sealing purposes, by providing the valve seat on the shoulder, and using the bulb portion as the other part of the seal. In such event, it would not be necessary for the stem portion to make an interference with the wall of port 30, although it could. Preferably, all cross-sections of the plug normal to the valving axis are circular. It is evident that there must be sufficient resilience in the material supporting the valve seat (or in the valve seat per se) and/or in the material comprising the plug that one or the other or both may deform to accommodate the other. The springback forces which result from this deformation will cause the valve seat and the plug to bear against each other to close the port, and to provide for retention either frictionally, as would be the event if there were no bulb but only a stem portion, or an abutting inter-engagement as in the event where a bulb is used to engage the shoulder. In every case, however, in reaching a closed position, the material of the plug and of the body will have been pressed together in interference so as to form an engagement between them. Both an embrasive fit, and an abutting retention caused as a consequence of moving a body such as the bulb through and beyond an undersized hole are referred to as interference fits. The term "interference fit" also includes the concept of a tapered plug entering a tapered or straight valve seat, the hole being undersized relative to the plug so as to be enlarged when the plug is forced into the valve seat.

Connector passages 45, 46 respectively connect to the first and second ports. A connector 47 connects to passage 45 and joins it to a shunt tube 48 of the general class shown in the aforesaid Schulte patent. This shunt tube comprises a pliable cylindrical tube with a slit 49 in the end thereof. This slit is formed without the removal of material, so that the tendency of its faces is to close upon one another. Backflow of fluid into the lumen 50 of the shunt tube will be prevented by this closure, and the slit acts as a check valve. Sufficient pressure in the lumen will cause the slit faces to spread apart and permit fluid to flow therefrom at some pressure which is sufficient to spread the slit faces apart.

Figure 6:
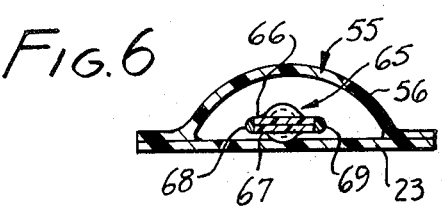
FIG. 6 is a cross-section taken at line 6—6 of FIG. 1.

A reservoir 55 shares the same base 23 as the valve. The reservoir includes a flexible wall 56 which with the base forms a chamber 57. Pressing down on the flexible wall will decrease the volume of chamber 57 and raise the pressure in any fluid which is trapped in it or in the valve. Connector passage 46 is connected to one reservoir port 58 which enters the chamber. A second reservoir port 59 also enters the chamber. It is connected to a connector 60 that in turn is connected to a catheter 61, shown as an open ended tube. The catheter is intended for implantation into a region to be drained such as the skull. A unidirectional check valve 65 may be placed between the catheter and chamber 57, most conveniently in the chamber itself. This valve may be of any suitable check valve construction. An elegantly simple construction known as a "miter valve" is shown in the drawings. As best shown in FIG. 6, it comprises a pair of sheet-like blades 66, 67 of flexible material joined at their edges by cemented axial joints 68, 69. The blades rest against one another in the absence of sufficient internal pressure between them to spread them apart against the resisting external pressure. External pressure tends to press the blades together. As can be seen in FIG. 1, sufficient pressure in port 59 will cause the sheets to spread apart and pass fluid. The reverse situation will close the valve.

To provide for free flow through the valve under all circumstances, except when it is purposely closed, a spacing, sometimes called an "offset" spacing 70, exists between the end of the plug and the valve seat when the flexible wall is free of distorting forces. This offset spacing is built into the valve. Accordingly, in the absence of sufficient external force on wall 25 to force the plug against the valve seat, fluid can flow without impediment through the valve. This offset will ordinarily be provided when the direction of flow is such that port 29 is the inlet and port 30 is the outlet. If the flow were to be in the other direction, it need not be provided, because pressure of the incoming fluid would tend to displace the plug unless it were forced into an interference fit.

FIGS. 7–10 illustrate another embodiment of the invention, and illustrates a situation wherein the offset need not be provided in the event that the valve of FIG. 1 is connected oppositely, so that incoming fluid enters port 30 instead of entering port 29.

Figure 7:
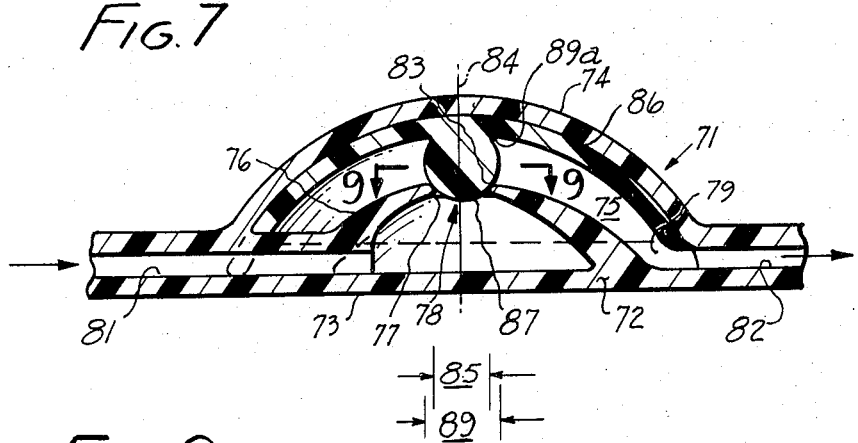
FIG. 7 is a cross-section of a complete alternate embodiment taken at line 7—7 of FIG. 10.

In FIG. 7, there is shown a valve 71 which can be substituted in the system of FIG. 1 for valve 21, except that the valve can be opened by pressure exerted at only one of its ports, rather than by pressure exerted at either of its ports as in the device of FIG. 1.

Valve 71 includes a base 72 with a flat bottom 73, a flexible wall 74 mounted to the flat bottom and forming a cavity 75 with the base. A diaphragm 76 extends upwardly from the bottom, and a perforation 77 through the diaphragm forms a first port 78 entering the cavity. Another port 79 enters the cavity through the base at one side of the diaphragm. Connector passages 81, 82 respectively connect to ports 78 and 79. The diaphragm is domed upwardly and is inherently flexible. It carries a valve seat 83 as a boundary of the said perforation. This valving surface has a valving axis 84 and a lateral dimension 85 in a plane normal thereto. The valving surface is shown circular, and the lateral dimension is therefore a diameter.

Figure 8:
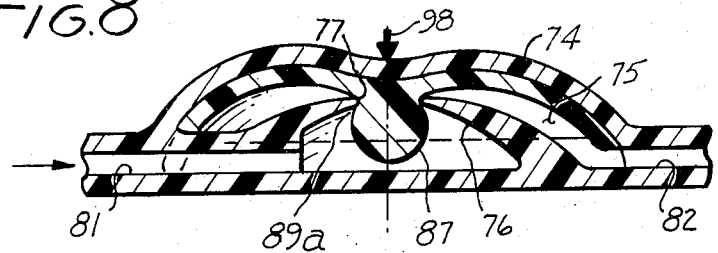
FIG. 8 is a view as in FIG. 7 of the device in another operating position.
Figure 9:
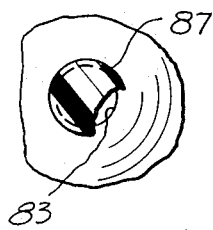
FIG. 9 is a fragmentary cross-section taken at line 9—9 of FIG. 7.
Figure 10:
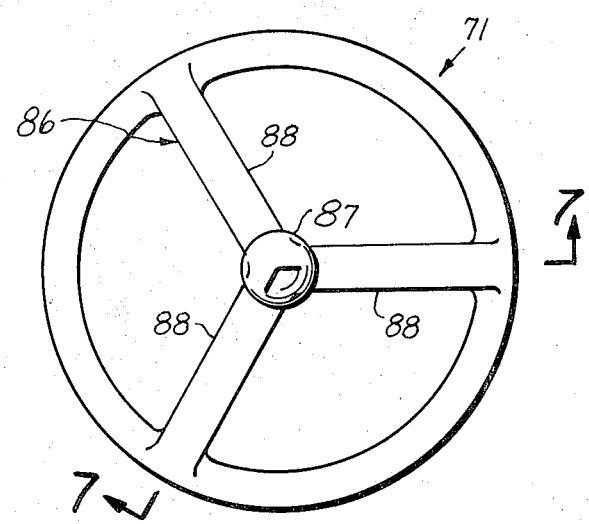
FIG. 10 is a fragmentary view of part of the device of FIG. 7, looking upwardly in FIG. 7.

The flexible wall 74 overlays support means 86 (sometimes called a "flexible member" or "deflectible means") which supports a plug 87. The support means comprises three spokes 88 which are resilient and attached to the valve body. They tend to return to the shape shown in FIG. 7 in the absence of distortive force. The plug comprises a ball-like body which has a lateral dimension 89 which is greater than lateral dimension 85 of the valve seat. As shown in FIG. 8, the plug can be forced through the valve seat, stretching it as it passes through, and the valve seat shrinks into the recessed portion 89a of the plug to make the closure, as well as to make the interference fit. No offset spacing need be provided in FIG. 7, because port 78 will have to be the inlet port, and the port where elevated pressure will be exerted in order to open the valve. The force exerted on the seat by the plug as it rests against the diaphragm should be light enough as not to require excessive upstream pressure to move the plug axially far enough to permit drainage without substantial impediment.

The catheter, shunt tube, check valve, reservoir, and valve are conveniently made entirely of medical grade silicon elastomer. The thickness and stiffness of the various sections will be selected to resist the expected forces. Little, if any experimenttation is required to determine these dimensions, because generally similar constructions (differing, of course, in function) are known in the art. The surface finish of the valve seats and plugs must be such that, with the lubricity provided by the fluids which they control, the plug can be moved into and out of the valve seat without requiring the exertion of excessive pressure. In the embodiment of FIG. 1, an interference of approximately 0.020 inches between the largest dimension 43 of the bulb portion and the smallest diameter 39 of the valve seat is satisfactory in a device made of silicon elastomer. A valve seat having a minimum diameter of about 0.080 inches is suitable. The same dimensions may be used in the device of FIG. 7. A close, non-interference fit, or an interference fit of about 0.005 inches between the stem portion and the valve seat is also suitable in the device of FIG. 1. Should the bulb not be provided, and the retention force be exerted between a cylindrical or tapered plug, the interference should be about 0.020 inches (comparing the undistorted dimensions of the abutting portions, measured prior to their being forced together).

In the embodiment of FIG. 7, the diaphragm should be somewhat elastically resilient as well as flexible, so that it can stretch over the ball-shaped plug. A diaphragm thickness adjacent to the perforation of about 0.020 inches is satisfactory in a silicon elastomer diaphragm.

The operation of the devices shown in the drawings should be evident from the foregoing. However, to recapitulate, the free end of the catheter is inserted into the region to be drained, and the valve and reservoir (or the valve when a reservoir is not used) are implanted in the body, perhaps against the skull, and sutured beneath the scalp 92. At the same time, the shunt is implanted, the catheter and the shunt are connected to the reservoir and to the valve, respectively, and the system is ready for use.

FIG. 1 shows the system in its freely flowing condition. Under adequate differential pressure, i.e., sufficient pressure at the inlet end of the catheter relative to the pressure at the discharge end and the height of the fluid columns, fluid will flow through the catheter to port 59, through check valve 65 whose blades will spread apart, through connector passage 46 and port 29 into cavity 26. If the plug has not been forced into the valve seat, fluid will pass through port 30 (through the offset spacing if it is provided, or displacing the plug if it is not), out connector passage 45, through connector 47 and shunt tube 48. It will spread the faces of slit 49 to escape, all as shown by the various arrows. Should there be insufficient system pressure to cause the foregoing events to occur, slit 49 will have closed and retained fluid in the system, and should the system differential have reversed, it will have closed to prevent backflow.

Figure 3:
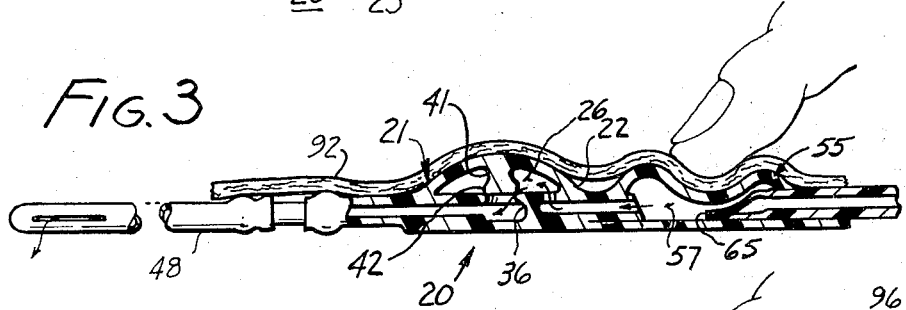

When the valve is to be closed (FIG. 2), the finger 91 will press down on the top of flexible wall 25 (through the scalp 92) and force the plug into the valving seat. The interference fit, whether frictional or interengaging, will cause the plug to be retained after the finger is removed. To open the valve, when a check valve is provided in the reservoir, one need only press through the scalp on the flexible wall 56, as shown in FIG. 3, and this will compress chamber 57 to a lesser volume. Check valve 65 will close to trap the fluid, which can only go to the valve, thereby forcing fluid through port 29 into cavity 26. The pressure exerted on the flexible wall 25 therein will cause it to rise, pulling the valve seat with it and opening port 30. The finger may then be removed. The system will now remain in the condition of FIG. 1 until it is again closed.

Figure 4:
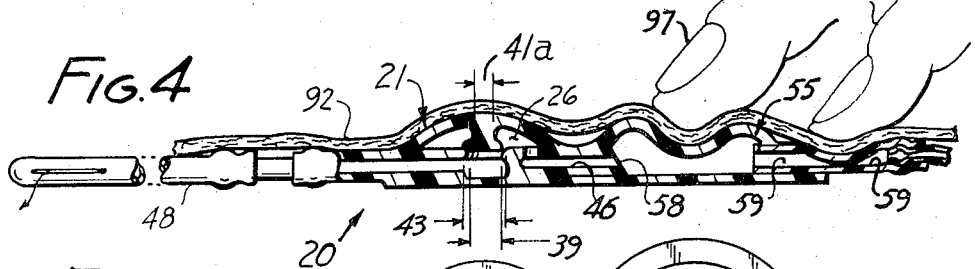
Figure 5:
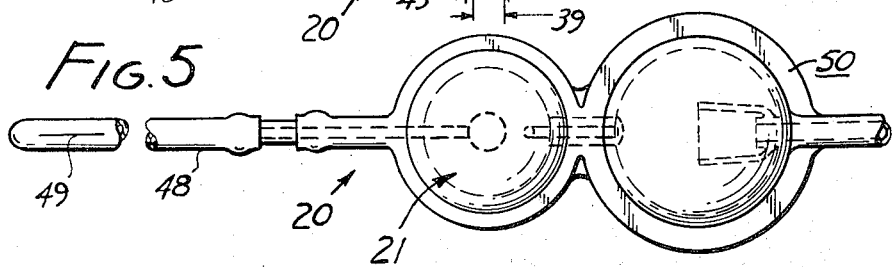
FIG. 5 is a top view of FIG. 1 taken at line 5—5 therein.

FIg. 4 shows that it is possible to utilize a system as in FIG. 1, but without check valve 65. One finger 96 is used to pinch closed port 59 (or a conduit leading to it), and simultaneously, another finger 97 is pressed down on the flexible wall of the reservoir, whereupon the same results are obtained as in FIG. 3. The first finger 96 provides the same effect as the check valve.

FIG. 7 operates in substantially the same manner as the device of FIG. 1, except that the flow direction through the valve is reversed relative to the plug from that illustrated in FIG. 1. In this case, although the valve seat could be offset from the valving surface, it is unnecessary because inlet pressure in passage 81 on the order of that needed for system flow will generate a force on the bottom of the valve seat tending to move it upwardly and away from the diaphragm. However, the invention encompasses the arrangement where there is an offset. The open-to-flow condition is shown in FIG. 7, awaiting flow pressure to cause an offset spacing of the valve seat and valving surface.

FIG. 8 illustrates the closed condition of the valve which has been obtained by exerting a force through the scalp, as shown by arrow 98, on the flexible wall 74 so as to press the plug into the valve seat. The wall of the perforation should be sufficiently elastic and resilient that it can expand to pass the valve seat and snap back into the groove at the base of the bulb. The grooved section is analogous to the stem in FIG. 1.

Preferably, the afore-said lateral dimensions of this groove, when acting as a stem portion, and of the perforation in its relaxed condition, should be such that a stretched interference fit readily occurs.

To open the valve of FIG. 7, an elevated pressure must be exerted beneath the diaphragm 76. In so doing, the diaphragm will tend to balloon and enlarge the perforation and the pressure will also exert a net upward force on the plug so as to cause separation of the plug from the valve seat. This elevated pressure may be supplied from the reservoir, which will be connected to port 81.

It is evident that many different plug shapes and valve seat shapes can be used. For example, tapered shapes, as well as cylindrical or stem-and-bulb. If tapered shapes are used without a bulb to form an inter-engagement, the taper angle should be within the cone of retention so that the plug is not ejected by the restorative forces exerted between the plug and the valve seat by the means which support the plug.

This invention provides a plug valve wherein a reliable opening and mechanically retained closure can be attained by finger manipulation through the scalp. In its closed condition, the valve is completely reliable and will remain closed until a sufficient hydraulic pressure is exerted to overcome an interference fit. The interference fit may be provided solely for retention purposes, or for both sealing and retention.

Should it be desirable to be able to check the open or closed condition of the valve, radio-opaque materials may be applied to or infused within the material of the valve seat at the plug and at the valve seat so that they can be visualized by x-ray.

This invention is not to be limited by the embodiments shown in the drawings and described in the description, which are given by way of example and not of limitation, but only in accordance with the scope of the appended claims.

We claim:

1. In a physiological shunt system for implantation in the body including a reservoir and a valve, the reservoir having a chamber in a compressible body for connection to the valve so that one of the ports of the valve will be connected to said chamber, whereby compression of the reservoir body will increase pressure in the valve to open it to flow, the improvement comprising the said valve for stoppage of drainage flow through the shunt system, which valve is adapted to be implanted in its entirety beneath the skin and to be closed by palpation contact exerted on the skin, said valve comprising: a valve body having an internal cavity, and a first port and a second port entering said cavity; a valve seat formed peripherally around one of said ports so that fluid flowing through its respective port passes through the valve seat, said valve seat having a valving axis; a plug in said cavity movable along said valving axis toward and away from the valving surface, the valve seat and plug having a lateral dimension which form an interference with one another when the plug is forced axially inside the valve seat, which interference fit retains the plug in the valve seat while the plug closes the same, movement toward the valve seat being attainable by exertion of palpation contact against the skin and thereby upon the valve body along the said valving axis; and deflectible means supporting the plug in the cavity, which means permits the plug to be pressed into the valve seat by said palpation contact with the skin, sufficient fluid pressure in one of said ports as a consequence of compressing the chamber of the reservoir causing the plug to be removed from the valve seat so as to open the port respective to the valve seat.

2. A valve according to claim 1 in which said deflectible means comprises a flexible wall which forms part of said body, deflection of which presses the plug inside the valve seat.

3. A valve according to claim 2 in which, in the absence of distortive external forces on said flexible wall the plug is spaced from the valve seat, whereby fluid can flow through the valve from one port to the other.

4. A valve according to claim 1 in which a shoulder is formed adjacent to the valve seat, spaced from the end of the respective port which is the closer to the plug, and in which the plug comprises a stem portion and a bulb portion, the lateral dimensions of the stem portion being less than that of the bulb portion and the axial length of the stem portion being at least as great as the spacing of the shoulder from the said end, whereby the bulb portion can be pressed through the valve seat to engage the shoulder and thereby be retained against removal from the valving surface.

5. A valve according to claim 4 in which the lateral dimensions of the bulb are greater than the respective lateral dimensions of the valve seat.

6. A valve according to claim 4 in which the lateral dimensions of both the stem and the bulb are greater than the respective lateral dimensions of the valve seat.

7. A valve according to claim 1 in which said deflectible means comprises a resiliently flexible member inside the cavity and mounted to the body, and in which the body includes a flexible wall which can be deflected to press against said deflectible means, whereby distortion of the flexible wall by external force will deflect the flexible member and move the plug into the valve seat, and whereby pressure in the port around which the valve seat is disposed will eject the plug from the valve seat.

8. A valve according to claim 7 in which an elastic diaphragm is provided across said cavity, the said one port being formed as a perforation therein, and the valve seat being formed as a boundary of said perforation, the said valve seat being stretchable to pass the plug.

9. A valve according to claim 8 in which a substantial area of said diaphragm is exposed to pressure at the said one port, whereby to receive a force to cause stretching of the valve seat.

10. In combination: a valve for the stoppage of drainage flow in a shunt system for the human body, which valve is adapted to be implanted in its entirety beneath the skin and to be closed by palpation contact exerted on the skin, said valve comprising: a valve body having an internal cavity, and a first port and a second port entering said cavity; a valve seat formed peripherally around one of said ports so that fluid flowing through its respective port passes through the valve seat, said valve seat having a valving axis; a plug in said cavity movable along said valving axis toward and away from the valving surface, the valve seat and plug having a lateral dimension which form an interference with one another when the plug is forced axially inside the valve seat, which interference fit retains the plug in the valve seat while the plug closes the same, movement toward the valve seat being attainable by exertion of palpation contact against the skin and thereby upon the valve body along the said valving axis; and deflectible means supporting the plug in the cavity, which means permits the plug to be pressed into the valve seat by said palpation contact with the skin, sufficient fluid pressure in one of said ports causing the plug to be removed from the valve seat so as to open the port respective to the valve seat; and a reservoir having a chamber in a compressible body connected to the valve so that one of the valve ports is connected to said chamber, whereby compression of the reservoir body increases the pressure in the valve to remove the plug from the valve seat.

11. Apparatus according to claim 10 in which a pair of reservoir ports enter said chamber, one of said reservoir ports being connected to a valve port, and the other being connected to a check valve which permits flow only into the chamber.

12. Apparatus according to claim 10 in which a pair of reservoir ports enter said chamber, one of said reservoir ports being connected to a valve port, and the other reservoir port being connected to a catheter for drainage of fluid.

13. Apparatus according to claim 12 in which the other reservoir port connects to said catheter through a check valve which permits flow only into the chamber.

14. Apparatus according to claim 10 in which the other of said valve ports is connected to a shunt tube for discharging fluid passed by the valve.

15. Apparatus according to claim 14 in which said shunt tube includes check valve means permitting fluid to flow only out of the tube and away from the valve.

16. Apparatus according to claim 14 in which the other reservoir port connects to a catheter through a check valve which permits flow only into the chamber.

17. Apparatus according to claim 12 in which the other of said valve ports is connected to a shunt tube for discharging fluid passed by the valve.

18. Apparatus according to claim 17 in which the other reservoir port connects to said catheter through a check valve which permits flow only into the chamber.

19. Apparatus according to claim 1 in which the plug and the valve seat are at least in part made of radio-opaque material, whereby the open or closed condition of the valve can be visualized by x-ray means, surrounding material being non-radio-opaque.

* * * * *

PO-1050
(5/69)

UNITED STATES PATENT OFFICE
CERTIFICATE OF CORRECTION

Patent No. 3,827,439      Dated August 6, 1974

Inventor(s) PLUG VALVE FOR PHYSIOLOGICAL SHUNT SYSTEMS

It is certified that error appears in the above-identified patent and that said Letters Patent are hereby corrected as shown below:

Page 1, [73]     after "calif." insert --; by said Schulte--

Col. 6, line 54    "valve seat" should read --plug--

Signed and sealed this 1st day of April 1975.

(SEAL)
Attest:

RUTH C. MASON
Attesting Officer

C. MARSHALL DANN
Commissioner of Patents
and Trademarks